United States Patent [19]

Patitsas et al.

[11] Patent Number: 6,013,218
[45] Date of Patent: Jan. 11, 2000

[54] TIRE CURE BLADDERS CURED WITH BROMINATED PHENOLIC RESIGNS AND CONTAINING PTFE AND/OR GRAPHITE

[75] Inventors: George Philemon Patitsas, Kent; Paul Harry Sandstrom, Tallmadge, both of Ohio

[73] Assignee: The Goodyear Tire & Rubber Company, Akron, Ohio

[21] Appl. No.: 09/039,848

[22] Filed: Mar. 16, 1998

Related U.S. Application Data

[63] Continuation-in-part of application No. 08/586,569, Jan. 16, 1996, Pat. No. 5,728,311, which is a continuation-in-part of application No. 08/315,389, Sep. 30, 1994, abandoned, and a continuation-in-part of application No. 08/313,953, Sep. 28, 1994, Pat. No. 5,538,218.

[51] Int. Cl.$^7$ .......................... B29C 35/00; C08F 210/08
[52] U.S. Cl. .......................... 264/315; 249/65; 264/326; 425/43; 425/52; 524/406; 524/462; 524/495
[58] Field of Search .................................. 249/65; 425/35, 425/39, 52, 43; 156/401; 264/117, 127, 130, 131, 315, 326; 524/406, 462, 495, 576

[56] References Cited

U.S. PATENT DOCUMENTS

| | | |
|---|---|---|
| 3,022,938 | 10/1962 | Gagne . |
| 3,223,676 | 12/1965 | Rucker . |
| 3,600,309 | 8/1971 | Loser et al. . |
| 3,853,809 | 12/1974 | Martin et al. . |
| 3,932,088 | 1/1976 | Harada et al. . |
| 3,940,455 | 2/1976 | Kaufman . |
| 3,967,968 | 7/1976 | Stone et al. . |
| 4,215,178 | 7/1980 | Martin, Jr. . |
| 4,310,427 | 1/1982 | Wun . |
| 4,333,977 | 6/1982 | Abrahams et al. . |
| 4,407,988 | 10/1983 | Abrahams et al. . |
| 4,863,650 | 9/1989 | Kohler et al. . |
| 5,063,268 | 11/1991 | Young et al. . |
| 5,162,409 | 11/1992 | Mroczkowski . |
| 5,238,991 | 8/1993 | Magnus et al. . |
| 5,538,218 | 7/1996 | Patitsas et al. . |

FOREIGN PATENT DOCUMENTS 0 344 021 A2  11/1990  European Pat. Off. .

OTHER PUBLICATIONS

"Standard Test Methods for Vulcanized Rubber and Thermoplastic Rubbers and Thermoplastic Elastomers–Tension$^1$", published by ASTM; Philadelphia, PA, Nov. 15, 1992 ASTM D412–92.

Chapter 10 of Rubber Technology $2^{nd}$ Ed., Edited by Maurice Morton, published by Robert E. Krieger Publishing Co.: Malabar, Florida, Jan. 1, 1973, pp. 249–273.

Trade Literature from Exxon Chemical Company: Houston, Texas, apparently published OOct. 1, 1993, consisting of 68 printed pages including general fliers, specification sheets, and tire curing bladder recipes all related to Exxpro™ products.

Technical Data Sheets SP1055 Flaked Resin from Schenectady International in Schenectady New York released on Oct. 9, 1996 (2–pages).

Technical Data Sheets SP1056 Flaked Resin from Schenectady International in Schenectady New York released on Oct. 15, 1996 (2–pages).

*Primary Examiner*—Mathieu D. Vargot
*Attorney, Agent, or Firm*—Henry C Young, Jr.

[57] ABSTRACT

Expandable bladders for use in curing presses for hydrocarbon rubbers, such as pneumatic tires, are a crosslinked elastomer composition including isobutylene repeat units. When PTFE and/or graphite is present, they can be cured with brominated phenolic resins in shorter periods of time. The fluorinated ethylene polymer is added in particulate form and thereafter dispersed throughout the bladder. The fluorinated ethylene polymer may or may not form fibers. The bladders may further include graphite. The bladders generally have enhanced lubricity, reduced adhesion to cured tire innerliners, better resistance to cracking during flexing, and have lower tension set than similar compositions without fluorinated ethylene polymers. The above enhancements allow hydrocarbon rubbers such as tires to be molded with fewer defects caused by abraded or deformed bladders. They also enhance the useful life of the bladder reducing the cost of tire curing.

19 Claims, No Drawings

TIRE CURE BLADDERS CURED WITH BROMINATED PHENOLIC RESIGNS AND CONTAINING PTFE AND/OR GRAPHITE

CROSS-REFERENCE

This application is a continuation-in-part application of U.S. Ser. No. 08/586,569 filed Jan. 16, 1996, now U.S. Pat. No. 5,728,311, for TIRE CURE BLADDERS CONTAINING POLYTETRAFLUOROETHYLENE POWDER AND USE THEROF which was a continuation-in-part of two applications, the first being U.S. Ser. No. 08/315,389, filed Sept. 30, 1994, now abandoned, for TIRE CURING BLADDERS CONTAINING POLYTETRAFLUOROETHYLENE POWDER AND USE THEREOF, and the second being U.S. Ser. No. 08/313,953, filed Sep. 28, 1994, now U.S. Pat. No. 5,538,218 for TIRE CURING BLADDER WITH IMPROVED RELEASE FROM THE TIRE INNERLINER.

FIELD OF INVENTION

This invention relates to a tire curing bladder having therein crosslinks from a brominated phenolic resin and either a fluorinated polymer added in particulate form or graphite or combinations of fluorinated polymer and graphite. The bladder includes butyl rubber polymers including halogenated butyl rubbers and/or halogenated copolymers of para-methylstyrene and isobutylene. It also relates to a method of curing tires utilizing such a bladder.

BACKGROUND OF THE INVENTION

Conventionally pneumatic rubber vehicle tires are produced by molding and curing a green or uncured and unshaped tire in a molding press. The green tire is pressed outwardly against a mold surface by means of an inner fluid-expandable bladder. By this method the green tire is shaped against the outer mold surface which defines the tire tread pattern and configuration of the sidewalls. By application of heat and pressure the tire is molded and cured at elevated temperatures.

In general practice, the expansion of the bladder is accomplished by application of internal pressure to the inner bladder cavity which is provided by a fluid such as gas, hot water and/or steam which also participates in the transfer of heat for the curing or vulcanization of the tire. The tire is then conventionally allowed to cool somewhat in the mold, sometimes aided by adding cold or cooler water to the bladder. Then the mold is opened, the bladder is collapsed by removal of its internal fluid pressure and the tire is removed from the tire mold. Such use of tire curing bladders is well known to those having skill in the art.

It is recognized that there is substantial relative movement between the outer contacting surface of the bladder and the inner surface of the tire during the expansion phase of the bladder. Likewise, there is considerable relative movement between the outer contacting surface of the bladder and the cured inner surface of tire during the collapse and the stripping of the bladder from the tire after the tire has been molded and vulcanized.

The bladder surface can tend to stick to a tire's inner surface after the tire is cured and during the bladder collapsing part of the tire cure cycle. This adhesion may cause roughening of the bladder surface if it is not controlled. This reduces bladder durability and can produce defective tires. For this reason, it is conventional practice to precoat the bladder and/or the inner surface of the green or uncured tires with a lubricant in order to provide lubricity between the outer bladder surface and inner tire surfaces during the entire molding operation. This lubricant has also been called a bladder lubricant, and is often a silicone polymer dispersed in a solvent or water.

It is to be appreciated that the release of the tire from its cure bladder in an industrial manufacturing setting is intimately associated with both the phenomenon of release (to prevent sticking) and the phenomenon of lubrication (to enhance slipping) between the bladder and the adjacent tire surfaces. The release aspect refers to the basic ability to avoid adhesion, or release and the aspect of lubrication relates to enhancing the ability of the surfaces to slip and enable a movement of the bladder with respect to the tire.

Butyl rubber is commonly used in tire curing bladders. Butyl rubber is a copolymer of predominantly isobutylene with small amounts of diene monomers usually isoprene to give sufficient unsaturation to allow the butyl rubber to be crosslinked. Copolymers of isobutylene and para-methylstyrene which are subsequently brominated are being manufactured by Exxon. These copolymers of isobutylene and para-methylstyrene are useful in applications where butyl rubber is used.

Fluorinated ethylene polymers have been added to thermoplastic and thermoset polymers in patents such as U.S. Pat. No. 3,002,938 where it was added at concentrations from 0.75 to 2.5 weight percent to provide ozone resistance; U.S. Pat. No. 3,600,309 where poly(tetrafluoroethylene) was added at concentrations from 0.05 to 0.45 parts per 100 parts rubber to solve extrusion related problems; U.S. Pat. No. 3,940,455 where oriented Teflon™ fibers were formed within an elastomer to enhance the apparent tensile strength; and U.S. Pat. No. 5,238,991 where poly(tetrafluoroethylene) and/or poly(fluoroethylene) compatibilizer was used in a tire side wall to enhance ozone resistance. The examples therein showed that ozone resistance is decreased in dynamic ozone tests when 10 parts poly(tetrafluoroethylene) per 100 parts rubber was used without a compatibilizer. The use of a compatibilizer allowed the use of larger amounts of poly (tetrafluoroethylene) in the composition.

U.S. Pat. No. 4,863,650 disclose the use of fillers such as kaolin, chalk, rock dust, silicas, carbon black and graphite in silicone release agent films to result in mat finishes. U.S. Pat. No. 4,310,427 disclosed the use of dry powders such as mica, talc, and graphite which were dusted onto the interior surfaces of "green" tires to provide lubrication and release. U.S. Pat. No. 3,967,978 disclosed the use of fine solid particles such as mica or graphite in the lubricant.

Phenolic resin curatives are accelerated (i.e. the curing rate is accelerated) by trace amounts of halogens typically added as a halogen containing rubber or attached to the phenolic resin. In the past the use of brominated phenolic resins such as Schenectady International's (Schenectady, N.Y.) SP1055 or 1056 in butyl rubber bladder compositions resulted in sticky compositions which adhered to the mixing equipment (e.g. Banbury™). Thus, the advantages of the faster cure rates of SP-1055 and 1056 were not available for butyl bladder applications. Further conventional processing aids for rubber compositions were not effective in solving the adherence problem.

Accordingly, it is desired to provide a faster curing rate (e.g. more bladders produced per mold) and curing bladders with increased lubricity, decreased adhesion of the bladder to cured tires, increased flex life, and improved heat stability.

SUMMARY OF THE INVENTION

Unexpectedly brominated phenolic resin curatives can be added to butyl rubber bladder compositions without objectional amounts of adherence of the bladder compositions to the mixing equipment when PTFE and/or graphite is present in the bladder in sufficient amount.

Fluorinated ethylene polymers added in particulate form were found to enhance lubricity (reduces coefficient of friction), lower adhesion to tire innerliners of butyl rubber curing bladders, enhance their resistance to failure in dynamic flex tests such as PG flex test ASTM 813 and reduce bladder growth (lower hot tension set). Brominated copolymers of isobutylene and p-methylstyrene were found to have enhanced heat stability in curing bladder applications and to have improved performance as curing bladders with incorporation of particulate fluorinated ethylene polymers. Graphite, molybdenum disulfide and/or tungsten disulfide, when used in combination with said fluorinated ethylene polymers, provides increased lubricity (i.e., lower coefficient of friction) and low adhesion to tire innerliners.

DETAILED DESCRIPTION

The fluorinated ethylene polymers (PFE) of the present invention are one or more polymers of one or more fluorinated ethylene monomers. These PFE's can be selected from the representative and illustrative group of polymers including homopolymers and copolymers of fluorinated ethylene monomers selected from the group consisting of tetrafluoroethylene, vinyl fluoride, vinylidene fluoride, trifluoroethylene, and chloro trifluoroethylene. The preferred polymers are polytetrafluoroethylene (PTFE) and copolymers of tetrafluoroethylene and one or more of the above stated fluorinated ethylene monomers with PTFE being the most preferred. The fluorinated ethylene polymers desirably have greater than 50, 75, 85 or 95% repeat units having one or more fluorine atoms. The PFE polymers of particular utilities are particulate PFE's having particle sizes of between 1 $\mu$m–25 microns, preferably 1–10 $\mu$m and most preferably less than 6 microns. Other particle sizes are useable. However, the small particle size PFE's are preferred because the smaller particles disperse better during the rubber mixing processes. The fluorinated ethylene polymers are desirably present from about 0.5 or 1 to about 10 or 30 phr, more desirably from about 4 to about 10 or 15 phr.

The PFE's of the present invention can be fibrillating or non-fibrillating and can be chosen from any of the commercial PFE polymers. Thus, the particulate fluorinated ethylene polymers may be converted to fibers during compounding of the rubber. One such particulate PFE is Polymist™ F-5A from Ausimont of Morristown N.J. U.S.A. However, other similar particulate PFE's can be utilized with equal advantage including those available from Dupont such as Teflon®. When a polymer is recited as consisting essentially of tetrafluoroethylene repeat units herein it is meant that the polymer behaves as polymers from tetrafluoroethylene do in the composition even though trace amount of initiator and chain transfer molecule fragments and/or other monomers may be present.

PFE compatibilizers known to the art may be used in these compositions or they may be excluded. They may be fluorine containing organic surfactants such as fluorocarbon surfactants from 3M Company named Fluorad™ FC430. 3M characterizes their surfactant as a non-ionic surfactant of a fluorinated alkyl ester being 100 percent active and having a Brookfield viscosity at 25° C., spindle No. 3 at 6 rpm of 15,000 centipoise, a specific gravity of 1.15 at 25° C., and a refractive index of 1.445 at 25° C., and a flash point above 300° F.

Other suitable PFE compatibilizers include Solsperse™ 13940 which is distributed in the U.S. by ICI Americas Incorporated of Wilmington, Del. This material is described in material safety data sheets as a water soluble liquid consisting of polymeric fatty ester 40 percent and a paraffinic solvent 60 percent having a boiling point of 464 to 500° F. (240–260° C.) and a specific gravity of 0.840.

Graphite can be included in the rubber composition to modify the properties of the bladder and is desired.

The graphite is desirably used in amounts from about 0.1 to about 20 phr, more desirably from about 0.5 to about 15 phr, and preferably from about 0.5 or 1 to about 5, 10, or 15 phr. Alternatively molybdenum disulfide and/or tungsten disulfide can be partially or fully substituted for the amount of graphite. The term "phr" refers to parts by weight per one hundred parts by weight rubber in a rubber composition. The term "phr" is a standard term used by most rubber formulators as it facilitates formulation changes and comparisons when all ingredients are measured in relation to one hundred parts of the rubber rather than the total formulation weight. Rubbers or rubbery polymers are crosslinkable, predominately non-crystalline polymers with Tg values below 0° C. and preferably below −20° C.

The graphite that is desirably incorporated into the curing bladders may be natural or synthetic. The graphite is added during mixing of the bladder formulation and is, therefore, dispersed throughout the molded bladder. Natural graphite can be found in Madagascar, Ceylon, Mexico, Korea, Australia, USSR, and China. Synthetic graphite can be made from carbonaceous material such as by heating petroleum coke to approximately 3,000° C. in an electric resistance furnace. A preferred graphite (to aid in uniform dispersion) is a powdery form such that greater than 80 weight percent of the graphite passes through a 325 mesh U.S. Standard screen, more desirably greater than 90 weight percent and preferably greater than 99 weight percent passes through said screen mesh. Such a synthetic graphite was used in Table I and is available as synthetic 1442 from Dixon Ticonderoga, N.J., USA.

A rubber for this application is a copolymer of at least one iso-olefin monomer and at least one para-alkylstyrene monomer which copolymer is desirably brominated. The iso-olefin may be one or more iso-olefins of 4 to 7 carbon atoms. The alkyl of the alkylstyrene may have 1 to 11 carbon atoms. Desirably at least 50, more desirably at least 75, 80, 85 or 95 weight percent of the rubbers of the bladder formulation are one or more copolymers having at least repeat units from iso-olefin and para-alkylstyrene. In an alternate embodiment, said polymers of isobutylene and para-methylstyrene are at least 10 or 20 weight percent of said rubbers of said bladder formulation, more desirably from about 10 or 20 to about 50 or 60 weight percent. Desirably said iso-olefin is 80, 90, or 95 weight percent or more isobutylene. Desirably, the para-alkylstyrene is 80, 90, or 95 weight percent or more para-methylstyrene. Desirably the methylstyrene content is from about 1 to about 20 weight percent para-methylstyrene, and more desirably from about 2 to about 15 weight percent para-methylstyrene. Desirably the isobutylene content is from about 80 to about 99 weight percent and more desirably from about 85 to about 98 weight percent.

In one aspect the copolymer of said at least one iso-olefin monomer and at least one para-alkylstyrene monomer is brominated, desirably after the monomers are polymerized. As recited in the European patent application below, bromination occurs preferentially on the para-methyl group. Desirably the bromine content of the copolymer is up to 5 weight percent and preferably from about 0.2 to 1.5 or 2.5 weight percent in the polymer. Diene monomers having 4 to 8 carbon atoms are optionally present up to 5 or 8 weight percent, desirably from 0.5 to 3 weight percent. The preferred copolymer of isobutylene and para-methylstyrene is essentially free of isoprene and other conjugated dienes. A highly preferred brominated copolymer is Exxpro™ from Exxon Chemical with a Mooney Viscosity ML (1+8) at 125° C. of 50 plus or minus five, a para-methylstyrene content of about 5 weight percent, isobutylene content of 94 or 95 weight percent, and a total bromine content of 0.8 weight percent. A European Patent Application having Publication No. 344,021 describes how to make such polymers and is hereby incorporated by reference.

Optionally butyl rubbers may be used in combination with the particulate poly(fluorinated ethylene)s either in combination with the isobutylene-para-methylstyrene copolymer or in lieu thereof. Optionally, graphite may also be used. Desirably at least 50 weight percent and more desirably at least 75, 80, 85 or 90 weight percent of all the rubbery polymers of the bladder composition are a butyl rubber polymer from isobutylene and one or more conjugated dienes, preferably isoprene. Desirably the isoprene is from about 1 to about 5 weight percent with the remainder being isobutylene (e.g. 95–99 weight percent). Such butyl rubber may be halogen substituted butyl rubbers such as chlorobutyl and bromobutyl where the halogen content is from about 0.5 to about 2, 3, or 4 weight percent.

Small amounts (e.g. up to 10 or 20 weight percent of all rubbery polymers) of diene based elastomers such as neoprene rubber may also be used. Neoprene rubber is also known as poly(chloroprene). It is a common co-curative in resin cure systems as described below. In rubber formulations, the neoprene is counted towards the 100 parts by weight rubber even though it has a separate function as a halogen containing elastomer. Other halogen containing rubbery polymers are less preferred halogen sources but may be included in amounts up to 10 or 20 weight percent of the rubbery polymers when a halogen source is desirable to activate a resin cure system. When halogenated (e.g. brominated) phenolic resins are used, the amount of halogen containing rubbery polymers can be reduced or they can be eliminated.

Desirably the 100 parts rubber of the bladders are at least 50, 75, 80, 85 or 90 weight percent polymers or copolymers of isobutylene. The butyl rubber bladder can be cured with sulfur cure and/or resin cure systems. Sulfur cure systems are less preferred with isobutylene polymers having residual unsaturation as reversion and/or increasing modulus during use as a curing bladder can result.

Resins for curing systems may be used in amounts from 1 to 10 phr and include conventional phenol formaldehyde resins. A resorcinol/formaldehyde resin cure system is often used to avoid reversion. Such cure systems for bladder compositions are well known to those having skill in the art. For an example, see U.S. Pat. No. 3,031,423 which is hereby fully incorporated by reference. A resin cure system using a reactive phenol-formaldehyde along with neoprene as a halogen source is shown in Table I. In Table II a resin cure system is used where the brominated copolymer of isobutylene and para-methylstyrene is the halogen source.

A preferred resin cure system (to accelerate the cure rate and increase the production rate of curing bladders) is from about 0.5 to about 12 parts by weight of halogenated phenolic resins. Preferred amounts are from about 1, 2, or 3 to about 8, 9, or 10 parts by weight of halogenated (e.g. brominated or chlorinated) phenolic resins. The halogen content of said phenolic resins is desirably from about 3 to about 9 weight percent based on the weight of the phenolic resin, more desirably from about 3 or 3.5 to about 4 or 5 weight percent. A preferred halogen is bromine. Desirably the methylol content is from about 8 to 15, more desirably from about 9 to 14 weight percent based on the weight of the halogenated phenolic resin. Desirably the ball and ring softening temperature of the halogenated phenolic resin is from about 80 to about 95 or 98° C., more desirably from about 85 to about 95° C. Examples of said brominated phenolic resins include SP-1055 and SP-1056 available from Schenectady International in Schenectady, N.Y.

The cured rubber compositions for use in a bladder may also contain conventional additives including fillers, peptizing agents, stearic acid, accelerators, sulfur vulcanizing agents, resin for curing, antiozonants, antioxidants, processing oils, activators, initiators, plasticizers, waxes, prevulcanization inhibitors, extender oils and the like.

If a sulfur cure system is to be used the amount of sulfur is conventionally from 0.1 to 2 parts per 100 parts rubber. The abbreviation phr will be used in this text to designate parts by weight per 100 parts by weight of rubber in a bladder. Representative sulfur vulcanizing agents include elemental sulfur (free sulfur) or sulfur donating vulcanizing agents, for example, an amine disulfide, polymeric polysulfide or sulfur olefin adducts. Rubber or rubbery polymers are crosslinkable predominantly non-crystalline polymers with Tg values below 0° C. and preferably below −20° C. Preferably the amount of sulfur is between 0.5 and 7 phr.

Accelerators for sulfur cured systems may be used in amounts from about 0.1 to about 5 phr more desirably from about 0.5 to about 2.5 phr. These types of accelerators are well known and include amines, disulfides, guanidines, thioureas, thiols, thiazoles, thiurams, sulfenamides, dithiocarbamates and xanthates. As classes, many of these accelerators are either too fast or too slow for curing bladder systems but they may be used in small amounts or specific compounds in each group may be appropriate for use in curing bladders. Blends of two or more accelerators may be used. Preferably the primary accelerator is a sulfonamide. If a secondary accelerator is used, it is preferably a guanidine, dithiocarbamate, or thiuram compound. Primary accelerators are generally used from about 0.5 to about 2.0 phr and secondary accelerators are generally used from about 0.1 to about 0.5 phr.

Antioxidants and antiozonants may desirably be added to the curing bladder composition. Antioxidants prevent oxidative crosslinking or oxidative chain scission so that the modulus and fracture properties of the rubber are unchanged during exposure to oxidation especially at elevated temperatures. Antioxidants for rubber compounds in general and for butyl rubber more specifically are well known to the art. Antidegradants include antioxidants and antiozonants. Desirable amounts are from about 0.1 to about 10 phr and more desirably about 2 to about 6 phr. Antiozonants are compounds that prevent chain scission due to exposure to ozone. They are also well known to the art. Antidegradants include monophenols, bisphenols, thiophenols, polyphenols, hydroquinone derivatives, phosphites, phosphate blends, thioesters, naphthylamines, diphenol amines as well as other diaryl amine derivatives, para-phenylenediamines, quinolines, and blended amines.

Fillers are desirably incorporated into the curing bladder compositions. They may be used in amounts from about 0 to about 200 phr and more desirably from about 30 to about 100 phr. A preferred filler is carbon black which is available in various particle sizes and with different surface reactivities from vendors such as Degussa. Reinforcing type fillers are preferred for use in curing bladders. Silica may be used in addition to carbon black. Silicas are generally described as precipitated silicas, fume silicas and various naturally occurring materials having substantial amounts of $SiO_2$ therein.

Fillers include reinforcing fillers such as carbon black which can be used in amounts from about 25 to about 75 or 85 phr. Typical carbon blacks that can be used include, for example, acetylene black, N110, N121, N220, N231, N234, N242, N293, N299, N326, N330, N332, N339, N343, N347, N351, N358, N375, N472, N539, N550, N683, N754, and N765. Preferably, a major portion of the carbon black is acetylene black.

The graphite being related to carbon black may be referred to in the bladder formulation as a partial replacement for some of the carbon black. However, the graphite performs a different function than the carbon black and the reduction in the amount of carbon black used is to maintain or nearly maintain a desirable ratio of binder (rubbers) to fillers.

Various oils and waxes may be used in curing bladder formulation depending upon the compatibility of the oils and waxes with the butyl rubber and the other components of the rubber formulation. They may be uniformly dispersed or they may desirably tend to phase separate (migrate to the surface) from the composition. Waxes include microcrystalline wax and paraffin wax. Oils include aliphatic-naphthenic aromatic resins, polyethylene glycol, petroleum oils, ester plasticizers, vegetable oils as received or vulcanized, pine tar, phenolic resin, polymeric esters, castor oil and rosins. Oils and waxes can be used in conventional individual amounts from about 1 to about 5 or up to about 10 phr. They are usually considered plasticizers and modulus modifiers. Fatty acids such as stearic acid, palmitic acid and oleic acid may be used in amounts from about 0.1 to about 5 phr with a range of from about 0.2 to about 1 phr being preferred. Zinc oxide may be present, for example, in amounts from about 0.5 to about 10 phr.

A procedure for mixing and molding curing bladders in general and for the examples is given below. It may be varied. The bladders in the Examples are monolayer bladders of uniform composition except for any migration of chemicals during or subsequent to molding and curing. In a Banbury mixer or the equivalent the rubber polymers, 80 weight percent of the carbon black, the oils, waxes, zinc oxide and optionally particulate fluorinated ethylene polymers, and optionally graphite, were mixed and dispersed until the mix temperature reached 165° C. The material was dumped onto a sheet-off mill and cooled. The cooled material was added to a Banbury mixer or equivalent in the second mixing stage. Then the other 20 weight percent carbon black was added during mixing until the Banbury mix temperature reached 150° C. The material was again dumped onto a sheet-off mill and cooled. In the third mixing stage the curatives (including any neoprene rubber, resin (preferably brominated phenolic resin), accelerators, and sulfur) were added and mixed until the mix temperature reached 115° C. The material was then dumped and cooled.

The curing bladder may be molded in an injection molding machine or a transfer molding machine. If transfer molding is selected the material from the Banbury is extruded as a slug. A cure meter is used to determine the approximate time to develop optimal cure at specific temperatures. The actual cure time will depend on heating rate and the gauge (thickness) of the curing bladder. The curing bladder desirably will have a toroidal shape. The curing bladder material tested in the examples without brominated phenolic resins was cured for 60 minutes at 171° C.

The curing bladders of this invention are useful for molding and curing various hydrocarbon materials including pneumatic vehicle tires and miscellaneous pneumatic tires for non-vehicle applications. Other hydrocarbon articles cured in bladder equipped presses include hoses, various sleeves, and air springs (a shock absorbing spring for commercial vehicles). The curing bladders have good lubricity, desirable release characteristics from cured hydrocarbon rubbers, extended dynamic flex life, and extended use lifetimes due to their enhanced thermal stability.

Typical properties of a curing bladder as produced are desirably a 300 percent modulus of about 4.0 to about 8.0 MPa, a breaking strength of about 5 to about 14 MPa, an elongation at break of about 400 to about 1,000 percent, a Shore A hardness of about 35 to about 90, a hot tension set ASTM D412 16 hours at 50 percent elongation and 190° C. of about 5 to about 20 or 35 percent, and a hot peel adhesion to a butyl rubber innerliner of about 40 to about 100 or 110N for a 5 mm wide strip. More desirably the curing bladder has a 300% modulus of about 4 to about 6 MPa, a breaking strength of about 8 to about 11 MPa, an elongation at break of about 600 to about 800%, a Shore A hardness of about 40 to about 75, a hot tension set of about 12 to about 17 or 20%, and a hot peel adhesion of about 45 to about 90. The properties of a curing bladder after aging 24 hours at 177° C. (351° F.) desirably include an elongation at break of about 300 to about 600% more desirably about 300 to about 500%, a 300% modulus of about 4.5 to about 7.5 MPa, a breaking strength of about 4.5 to about 7.5 MPa, a Shore A hardness of about 55 to about 85, a hot tension set of about 13.0 to about 18.0% and a coefficient of friction with lubrication ASTM D4518 of about 0.4 to about 1.0 tested at 150° C. (302° F.).

The following Tables I and II show Examples I and II of butyl rubber curing bladders that include fluorinated ethylene polymers. The amounts of materials specified are parts by weight unless otherwise indicated. Example I with its control shows the effect of tetrafluoroethylene, Polymist™ F-5A, on the properties of a bladder formulated with a copolymer of isobutylene and isoprene. Table II and Example II thereof show the effect of tetrafluoroethylene on copolymers of isobutylene and para-methylstyrene.

TABLE I

|  | Control | Ex I |
|---|---|---|
| Butyl Rubber * | 95 | 95 |
| Carbon Black | 55 | 55 |
| Processing Oil and Wax | 11.2 | 11.2 |
| Curatives ** | 14 | 14 |
| Neoprene Rubber | 5.0 | 5.0 |
| Tetrafluoroethylene | 0 | 10 |
| Physical Properties Before Aging | | |
| 100% Modulus MPa | 1.54 | 1.84 |
| 300% Modulus MPa | 4.17 | 5.08 |
| Break Strength MPa | 9.01 | 8.82 |
| Elongation at Break % | 721 | 608 |
| Hardness 100° C. Shore A | 40.5 | 46.8 |
| 95° C. Peel Adhesion to halobutyl Innerliner (Newtons) (No Lubricant) | 88 | 49 |
| Physical Properties After 24 Hours at 177° C. in Air | | |

TABLE I-continued

|  | Control | Ex I |
|---|---|---|
| Coefficient of Friction - No lubricant D4518 (Method B) | 2.24 | 2.24 |
| Coefficient of Friction with lubricant *** D4518 (Method B) | 0.77 | 0.62 |

\* Mixture of two different copolymers of isobutylene and isoprene having a Mooney ML 1 + 8 @ 125° C. of 51 ± 5 and one having slightly less than 1% unsaturation and the other having between 1 and 2% unsaturation.
\*\* Curative amounts, exclusive of neoprene rubber, include reactive phenol formaldehyde and zinc oxide in conventional amounts.
\*\*\* Lubricant was a silicone oil emulsified in water with fumed silica.

Example I of Table I had slightly higher moduli than the control and slightly lower elongation to break. The higher moduli in Table I is believed to be caused by tetrafluoroethylene fibers formed from the particulate polytetrafluoroethylene. Microscopic examination confirmed fibers were present. The 95° C. peel adhesion to innerliner was significantly improved (reduced) in Example I which would facilitate removing a bladder from a cured tire. The coefficient of friction indicates a lubricant would be necessary. With a lubricant Example I resulted in a lower coefficient of friction which would enhance movement of the bladder during tire forming and curing.

Example II in Table II using an isobutylene-para-methylstyrene copolymer have similar moduli and elongation to break to its control. Example II had a more desirable hot tension set (lower amount of distortion) than its control. Example II also had better durability in the hot pierced groove flex test (ASTM 813) indicating a longer lifetime for bladders of that formulation. The coefficient of friction after aging for Example II was lower indicating enhanced bladder movement during tire forming and curing.

Tables III, IV and V show a control without polytetrafluoroethylene or graphite, Example III with 8 grams of graphite powder, Example IV with 8 grams of polytetrafluoroethylene, and Example V with 4 grams of graphite and 4 grams of polytetrafluoroethylene. It is noted that about 64 to about 66 weight percent of the total carbon black was added in the first mixing stage rather than 80 weight percent as recited in the general procedure. Further, four mixing stages were used rather than three as set forth in the general procedure. The amount of carbon black was reduced to partially compensate for the added solids from polytetrafluoroethylene/graphite.

TABLE II

| First Mix | Control | Ex II |
|---|---|---|
| Isobutylene-para-methylstyrene copolymer (Exxpro ™) (brominated)* | 100 | 100 |
| Carbon Black | 55.0 | 55.0 |
| Processing Oils | 6.0 | 6.0 |
| Processing Aids** | 5.5 | 7.5 |
| Polytetrafluoroethylene | 0.0 | 5.0 |
| Curatives*** | 9.15 | 9.15 |
| Physical Properties Before Aging | | |
| 300% Modulus, MPa | 4.49 | 4.21 |
| Break Strength MPa | 9.90 | 9.49 |
| % Elongation at Break | 764 | 780 |
| Shore A Hardness 100° C. | 46 | 44 |
| Hot Tension Set 16 hrs. 190° C. 50% Elongation (D412) | 17 | 13.00 (23.5% less tension set) |
| Hot PG Flex ASTM 813 | 1 of 3 samples cracked after 60 min. and broke after 180 min. | 1 of 3 samples cracked after 180 min. Stopped test at 180 min (none broke) |
| Lubricity, Coefficient of Friction (no lubricant) D4518 (Method B) | 3.25 | 3.25 |
| Hot PG Flex ASTM 813 | 2 of 3 cracked after 60 min. Others cracked after 120 min. One broke after 240 min. | 1 of 3 cracked after 120 min and broke after 240 min. The other two samples did not crack after 240 min. |
| Hot Tension Set (16 hrs. 190° C. 50% Elongation) D412 | 17.5 | 12.50 (28.6% less tension set) |
| Coefficient of Friction (no lubricant) D4518 (Method B) | 2.85 | 2.65 |
| Physical Properties After Aging 24 Hours at 191° C. (375° F.) | | |
| Hot PC Flex ASTM 813 | 2 of 3 cracked after 60 min. Others cracked after 120 min. One broke after 240 min. | 1 of 3 cracked after 120 min and broke after 240 min. The other two samples did not crack after 240 min. |
| 300% Modulus MPa | 5.21 | 4.94 |
| Break Strength MPa | 5.91 | 5.48 |
| % Elongation at Break | 387 | 382 |

\*ML (1 + 8) at 125° C, 50 ± 5, 5 weight percent para-methylstyrene, 0.8 weight percent bromine.
\*\*Processing aids include wax and fatty acid in conventional amounts.
\*\*\*Curatives include zinc oxide, accelerator, phenol formaldehyde resin and sulfur in conventional amounts.

TABLE III

EXXPRO ™ BLADDER COMPOUND WITH POLYTETRAFLUOROETHYLENE/GRAPHITE

| 1st Stage | Control | Ex III | Ex IV | Ex V |
|---|---|---|---|---|
| EXXPRO ™ Butyl* | 100 g | 100 | 100 | 100 |
| Carbon Black | 36.5 | 32.5 | 32.5 | 32.5 |
| Castor Oil | 6 | 6 | 6 | 6 |
| Cure Retarder | 0.8 | 0.8 | 0.8 | 0.8 |
| Graphite Powder | | 8 | | 4 |

TABLE III-continued

EXXPRO ™ BLADDER COMPOUND WITH
POLYTETRAFLUOROETHYLENE/GRAPHITE

| 1st Stage | Control | Ex III | Ex IV | Ex V |
|---|---|---|---|---|
| Polytetrafluoro-ethylene Powder | | | 8 | 4 |
| 2nd Stage | | | | |
| Carbon Black | 18.5 | 18.5 | 18.5 | 18.5 |
| Processing Aid** | 5.5 | 5.5 | 5.5 | 5.5 |
| 3rd Stage | | | | |
| Curatives *** | 4.15 | 4.15 | 4.15 | 4.15 |
| 4th Stage | | | | |
| Curatives | 5 | 5 | 5 | 5 |
| Total: | 176.45 | 180.45 | 180.45 | 180.45 |

*ML (1 + 8) at 125° C. 50 ± 5, 5 weight percent para-methylstyrene, 0.8 weight percent bromine.
**Processing aids include wax and fatty acid in conventional amounts.
***Curatives include zinc oxide, accelerator, phenol formaldehyde resin and sulfur in conventional amounts.

TABLE IV

PHYSICAL PROPERTIES OF EXXPRO ™ WITH
POLYTETRAFLUOROETHYLENE/GRAPHITE

| | Control | Ex III | Ex IV | Ex V |
|---|---|---|---|---|
| $T_{90}$, min @ 171° C. | 11.25 | 11.5 | 13.25 | 10.9 |
| $T_{25}$, min @ 171° C. | 5.45 | 6 | 6.6 | 6 |
| Molded Specimen | 60 min., 171 C. | | | |
| 300% Modulus, MPa | 4.77 | 4.28 | 4.07 | 4.27 |
| Break Strength, MPa | 9.76 | 9.33 | 9.35 | 9.67 |
| % Elongation at break | 725 | 725 | 740 | 745 |
| Shore A Hardness at 100° C. | 46.7 | 44.7 | 44.3 | 45.5 |
| Rebound at 100° C. | 43.1 | 44.9 | 45.2 | 45.8 |
| 95° C. Peel Adhesion to Halobutyl Innerliner, Newtons (No Lubricant) | 90 | 51 | 53 | 49 |
| Coefficient of Friction (No Lubricant ASTM D4518) | 2.7 | 2.7 | 2.4 | 1.9 |
| Hot Tension set, % ASTM D412 | 12 | 12 | 12 | 13 |

TABLE V

PHYSICAL PROPERTIES AFTER AGING FOR 24 HRS
AT 375° F. (191° C.)

| | Control | Ex III | Ex IV | Ex V |
|---|---|---|---|---|
| 300% Modulus, MPa | 5.1 | 5 | 4.9 | 4.9 |
| Break Strength, MPa | 5.2 | 5.1 | 5.3 | 5 |
| % Elongation at Break | 333 | 338 | 364 | 341 |
| Shore A Hardness at 100° C. | 59.4 | 59.4 | 53.6 | 59.3 |
| Rebound at 100° C. | 38.1 | 38.6 | 38.6 | 38.6 |

The data in Table IV shows that Examples III, IV and V have decreased 95° C. peel adhesion to halobutyl innerliner values over the Control which has neither polytetrafluoroethylene nor graphite. Example V with 4 g of polytetrafluoroethylene and 4 g of graphite has comparable 95° C. peel adhesion to both Example III with 8 g of graphite, and Example IV with 8 g of polytetrafluoroethylene. Example V has an unexpected and more desirable lower coefficient of friction value than (i) control; (ii) Example III with graphite; and (iii) Example IV with polytetrafluoroethylene. The lower coefficient of friction value should be beneficial in allowing the bladder to move more easily in relationship to the tire innerliner minimizing tire defects caused by poor bladder alignment. The remainder of the physical properties of Tables IV and V indicate that the other physical properties of the curing bladder formulation are not negatively affected.

The tensile tests on the samples are well known to the art and generate the modulus break strength, and elongation values. The elongation test is ASTM D412. The hardness test is D2240 Shore A. The coefficient of friction test is a measure of the friction between a cured bladder composition and an uncured tire innerliner material. It is expressed as a ratio of pulling force divided by the specified load units by test method D4518 Method B. Desirably the value is below 0.7 so the data indicates a lubricant is needed. Lubricity as previously mentioned is necessary for the bladder to slide or move relative to the tire during inflation of the bladder. Without lubricity the bladder surfaces may be bent and folded over itself resulting in undesired bladder shape and misshaped tires.

The peel adhesion test measures interfacial adhesion between two different substrates at 95° C. which are of different chemical compositions in this disclosure. Interface modifiers are optionally added to the interface of the bladder substrate before the test is made. These are an emulsifiable silicone oil dispersed in water and thickened with a fumed silica. A Mylar™ (polyester) sheet having laterally placed windows cut therein (5 mm wide by 100 mm longer) is placed between the bladder material and an uncured tire innerliner material which is the other substrate. The window in the Mylar™ sheet creates a known area of interfacial adhesion between the bladder sample and the tire innerliner sample. A fabric backing is applied to bladder material and the butyl innerliner and is secured with adhesive and/or stitching. The assembled sample of the two substrates with their fabric backing is cured in a diaphragm curing mold for 28 minutes at 150° C. with 100 psi pressure (0.69 MPa) in the diaphragm. After this process the assembled sample is cut in 1" (2.54 cm) wide strips with the window portion of the Mylar longitudinal and centered therein, the two substrate materials are separated slightly by hand operation. They are then mounted in an Instron™ type force displacement tester in a configuration such that the peel angle between the separated substrates is 180°. The force displacement tester separates the substrates at a rate of 51 mm/min and records the force used. The average force used over the adhered area divided by the sample width (5 mm) is recorded as the adhesion value.

The hot pierced groove (PG) flex test ASTM 813 measures the resistance to cracking of the bladder compound when initiated by a puncture and encouraged or facilitated by the presence of a groove. This is a dynamic test and, therefore, is used as an estimate of how a roughened or abraded bladder will resist cracking and failure.

Table VI illustrates that a bladder composition can be cured in a much shorter time, i.e. 11.0 minutes to 90% cure ($T_{90}$, min) with a brominated phenolic resin (SP-1055) rather than 26 minutes with a conventional phenolic resin (SP-1044). The physical properties of interest (tensile strength, maximum percent elongation and modulus) are very comparable. Even after aging physical properties are comparable indicating that over-curing and/or reversion are not problems. It is noted that more carbon black was tolerated in the recipe and resulted in better thermal conductivity. Better thermal conductivity provides faster heat transfer to a curing tire.

TABLE VI

Comparison of Different Phenolic Resin Curatives

| | Control | Example VI |
|---|---|---|
| Butyl Rubber | 95 phr | 97.5 phr |
| Acetylene Carbon Black | 45 phr | 60.0 phr |
| Reactive Phenolic Resin (SP-1044) * | 9 phr | 4.5 phr |
| Brominated Phenolic Resin (SP-1055) * | 0 phr | 4.5 phr |
| Graphite | 0 phr | 1.5 phr |
| PTFE Powder | 0 phr | 1.5 phr |
| Neoprene Rubber | 5 phr | 2.5 phr |
| Physical Properties | | |
| $T_{25}$, min at 190 C. | 5 | 3.4 |
| $T_{90}$, min at 190 C. | 26 | 11.0 |
| 300% Modulus, MPa | 5.4 | 6.8 |
| Thermal Conductivity | 0.28 | 0.35 |
| PG Flex at 95 C. | 0.04 | 0.04 |
| Tensile Strength, MPa | 10.17 | 9.14 |
| Max. Percent Elong. | 674 | 540 |
| Hardness at RT (Shore A) | 63. | 68. |
| Hardness at 100° C. | 49 | 54 |
| Rebound at RT | 12 | 11 |
| Rebound at 100° C. | 44 | 38 |
| Aged Physical Properties (24 hrs at 375° F. in air) | | |
| 200% Modulus, MPa | 4.6 | 5.2 |
| Tensile Strength, MPa | 5.2 | 5.4 |
| Max. Percent Elong. | 273 | 234 |
| Hardness at RT | 85 | 87 |
| Hardness at 100° C. | 68 | 70 |
| Rebound at RT | 19 | 18 |
| Rebound at 100° C. | 38 | 35 |
| Hot Tension Set | 20 | 21 |

* SP-1044 and SP-1055 are phenolic resins produced by Schenectady International, Inc.

Table VII illustrates complete substitution of a brominated phenolic resin (SP-1055) for a conventional phenolic resin (SP-1044). Note that graphite and PTFE (polytetrafluoroethylene) were included in the example to avoid adhesion problems during mixing. An unreported control was prepared with the brominated phenolic resin but with neither PTFE nor graphite. The material adhered to the inside of the Banbury™ and had to be scraped out.

TABLE VII

Comparison of Different Phenolic Resin Curatives

| | Control | Example VII |
|---|---|---|
| Butyl Rubber | 95 phr | 100 phr |
| Thermally Conductive Carbon Black | 45 phr | — |
| Electrically Conductive Carbon Black | | 45 |
| Reactive Phenolic Resin (SP-1044) | 9.0 | |
| Brominated Phenolic Resin (SP-1055) | 0 | 9.0 |
| Graphite | 0 | 1.5 |
| PTFE Powder | 0 | 1.5 |
| Neoprene Rubber | 5 | 0 |
| Physical Properties | | |
| Rheometer at 190 C. $T_{90}$, min | 23.3 | 13.6 |
| 300% Modulus, MPa | 6.1 | 6.5 |
| PG Flex at 95 C. (tear in Inches) (240 min) | 0.35 | 0.13 |
| Thermal Conductivity | 0.3 | 0.3 |
| Tensile Strength, MPa | 10.00 | 10.4 |
| Max. Percent Elong. | 590 | 579 |
| Hardness at RT | 67 | 68 |
| Hardness at 100° C. | 52 | 51 |
| Rebound at RT | 13 | 13 |
| Rebound at 100° C. | 43 | 39 |
| Aged Physical Properties (24 hrs. at 375° F. in air) | | |
| 200% Modulus, MPa | 4.7 | 4.2 |
| Tensile Strength, MPa | 4.8 | 7.1 |
| Max. Percent Elong. | 229 | 415 |
| Hardness at RT | 87 | 72 |
| Hardness at 100° C. | 71 | 56 |
| Rebound at RT | 20 | 16 |
| Rebound at 100° C. | 39 | 34 |
| Hot Tension Set | 35 | 30 |

The butyl rubber in Tables VI and VII was a copolymer of isobutylene and diene having a Mooney viscosity of 52 to 57.

The curing bladders described herein are useful in bladder or diaphragm type curing presses to cure hydrocarbon rubber compositions and preferably pneumatic tires. These presses desirably have one or more molding surfaces besides the diaphragm or bladder. The uncured hydrocarbon composition is placed in the mold, the mold is closed, and the bladder or diaphragm is inflated (expanded usually with a heated gas such as steam). This sandwiches the uncured composition between the bladder or diaphragm and the one or more other mold surfaces. The hydrocarbon rubber typically flows and conforms to the texture and shape of the one or more other mold surfaces which are often a metal or alloy thereof and rather rigidly fixed during the molding operation. Further heating of the uncured composition causes it to cure (also called vulcanization or crosslinking) which solidifies the final shape of the article conforming to the one or more rigid mold surfaces. The bladder or diaphragm is then deflated (removing the internal pressure) to facilitate removal of the molded parts. Depending on the shape of the article, one or more of the other molding surfaces may physically move to open the mold further facilitating part removal.

While in accordance with the patent statutes the best mode and preferred embodiment has been set forth, the scope of the invention is not limited thereto, but rather by the scope of the attached claims.

What is claimed is:

1. In a curing press for a hydrocarbon rubber composition which uses an expandable bladder to assist in shaping and curing said rubber composition;

the improvement wherein the bladder comprises crosslinks derived from about 0.5 to about 12 parts by weight of a halogenated phenolic resin curative and either from about 0.5 to about 10 parts by weight of at least one fluorinated ethylene polymer; or from about 0.1 to about 20 parts by weight of graphite; molybdenum disulfide and/or tungsten disulfide or combinations thereof, and wherein said fluorinated ethylene polymer and/or said graphite, molybdenum disulfide, and/or tungsten disulfide are added in a particulate form to and dispersed within a formulated rubber bladder compound, said formulated rubber bladder compound comprising at least one rubbery polymer which comprises at least one isobutylene polymer;

wherein said parts by weight are based on 100 parts by weight of said at least one rubbery polymer, and wherein said formulated rubber compound after curing and aging for 24 hours at 177° C. has an elongation at break (ASTM D412) from about 300 to about 600%.

2. In a curing press according to claim 1, wherein said at least one isobutylene polymer comprises a polymer comprising from about 80 to about 99 weight percent repeat units from isobutylene and from about 1 to about 20 weight percent repeat units from para-methylstyrene and said at least one fluorinated ethylene polymer having at least one fluorine atom in at least 75 mole percent of its repeat units.

3. In a curing press according to claim 1, wherein said at least one isobutylene polymer comprises at least 50 phr of at least one polymer of 95 to 99 weight percent repeat units from isobutylene and from 1 to 5 weight percent of repeat units from one or more conjugated dienes and wherein said halogenated phenolic resin comprised from about 3 to about 9 weight percent bromine.

4. In a curing press according to claim 1, wherein said halogenated phenolic resin had a methylol content from about 8 to about 15 weight percent and a halogen content from about 3 to about 9 weight percent and the halogen is bromine.

5. In a curing press according to claim 4 wherein said at least one isobutylene polymer comprises at least 85 weight percent of said at least one rubbery polymer of said bladder, and wherein said bladder includes from about 0.5 to about 10 parts by weight of said graphite and from about 0.5 to about 10 parts by weight of said at least one fluorinated ethylene copolymer.

6. In a curing press according to claim 5, wherein said isobutylene polymer is comprised of a brominated copolymer of para-methylstyrene and isobutylene and is from about 10 to about 60 weight percent of said at least one rubbery polymer.

7. An expandable curing bladder composition comprising;
a) either from about 0.5 to about 10 parts by weight of at least one fluorinated ethylene polymer; or from about 0.1 to about 20 parts by weight of graphite, molybdenum disulfide, and/or tungsten disulfide; or combinations thereof,
b) at least one rubbery polymer comprising at least one isobutylene polymer having at least 50 weight percent isobutylene units, and
c) one or more curatives including from about 0.5 to about 12 parts by weight of a halogenated phenolic resin curative for crosslinking said at least one rubbery polymer,
wherein said parts by weight are based upon 100 parts by weight of said at least one rubbery polymer,
wherein said at least one fluorinated ethylene polymer, said graphite, molybdenum disulfide, or tungsten disulfide, or combinations thereof are added in particulate form and dispersed in said at least one rubbery polymer.

8. A composition according to claim 7, wherein said at least one isobutylene polymer comprises from about 95 to about 99 weight percent repeat units from isobutylene and from 1 to 5 weight percent repeat units from one or more conjugated dienes, and wherein said at least one fluorinated ethylene polymer has at least one fluorine atom on at least 75 mole percent of its repeat units, and said at least one polymer of isobutylene and conjugated diene is at least 50 weight percent of the rubbers of said bladder.

9. An expandable curing bladder composition according to claim 7, wherein said at least one isobutylene polymer comprises a brominated copolymer of from about 80 to about 99 weight percent repeat units from isobutylene and from about 1 to about 20 weight percent repeat units from para-methylstyrene, said at least one fluorinated ethylene polymer has one or more fluorine atoms in at least 75 percent of its repeat units, and said brominated copolymer of isobutylene and para-methylstyrene is at least 50 weight percent of the rubbers of said bladder composition.

10. A composition according to claim 7, wherein said at least one fluorinated ethylene polymer comprises a dispersed polymer consisting essentially of tetrafluoroethylene repeat units.

11. A composition according to claim 7, wherein said halogenated phenolic resin is a brominated phenolic resin and has a bromine content from about 3 to about 9 weight percent.

12. A composition according to claim 8, wherein and said bladder includes from about 0.5 to about 10 parts by weight of graphite and from about 0.5 to about 10 parts by weight of said at least one fluorinated ethylene polymer dispersed therein.

13. A composition according to claim 12, wherein said phenolic resin has a methylol content of from about 8 to about 15 weight percent.

14. A composition according to claim 13, wherein said at least one fluorinated ethylene polymer consists essentially of tetrafluorethylene units.

15. A method of using an expandable rubber bladder to shape and cure a rubber composition, said method comprising:
a) inserting an uncured rubber composition into a curing mold having an expandable rubber bladder positioned therein and at least one other mold surface, said expandable rubber comprising a reaction product of at least:
1) at least 50 parts by weight of at least one isobutylene polymer having at least 50 weight percent isobutylene units,
2) optionally at least one other rubber polymer,
3) either from about 0.5 to about 10 parts by weight of at least one fluorinated ethylene polymer or from about 0.1 to about 20 parts by weight of graphite, molybdenum disulfide and/or tungsten disulfide; or combinations thereof, added in particulate form and dispersed through said at least one isobutylene polymer, and
4) from about 0.5 to about 12 parts by weight of a halogenated phenolic curative for curing said at least one isobutylene polymer, and
wherein said parts by weight are based upon 100 parts by weight of said at least one isobutylene polymer and said optional at least one rubbery polymer in said bladder, and wherein said bladder after aging for 24 hours at 177° C. has an elongation to break (ASTM D412) of from about 300 to about 600%,
b) closing said mold and expanding said rubber bladder outwardly against the inner surface of said uncured rubber composition to force said uncured rubber composition against said at least one other mold surface,
c) curing said rubber composition under heat and pressure forming a cured rubber composition,
d) deflating said expandable bladder, and
e) removing said cured rubber composition from said curing mold.

16. A method according to claim 15, wherein said halogenated phenolic resin is a brominated phenolic resin and has from about 3 to about 9 weight percent bromine.

17. A method according to claim 16, wherein said at least one isobutylene polymer is at least 80 parts by weight and is comprised of a polymer being 80 to 99 weight percent repeat units from isobutylene and 1 to 20 weight percent repeat units from para-methylstyrene, said polymer being brominated.

18. A method according to claim 16, wherein said at least one isobutylene polymer is at least 80 parts by weight and is comprised of a polymer being 95 to 99 weight percent repeat units from isobutylene and from 1 to 5 weight percent repeat units from one or more conjugated dienes.

19. A method according to claim 16, wherein said expandable bladder includes from 0.5 to 20 parts by weight of graphite and from about 0.5 to about 10 parts by weight of said at least one fluorinated ethylene polymer dispersed therein.

* * * * *